(12) United States Patent
Olaopa

(10) Patent No.: US 6,562,237 B1
(45) Date of Patent: May 13, 2003

(54) BIOLOGICAL NUTRIENT REMOVAL USING THE OLAOPA PROCESS

(76) Inventor: Tox Olaopa, 34 Park Place Hillview Road, Woking Surrey (GB), GU22 7NP ( * ) Notice: Subject to any disclaimer, the term of this patent is extended or adjusted under 35 U.S.C. 154(b) by 0 days.

(21) Appl. No.: 09/926,670

(22) PCT Filed: Dec. 6, 1999

(86) PCT No.: PCT/GB99/04059

§ 371 (c)(1), (2), (4) Date: Feb. 1, 2002

(87) PCT Pub. No.: WO00/34188

PCT Pub. Date: Jun. 15, 2000

(30) Foreign Application Priority Data

Dec. 4, 1998 (GB) .............................................. 9826575
Jun. 2, 1999 (GB) .............................................. 9912660

(51) Int. Cl.$^7$ .................................................. C02F 3/30
(52) U.S. Cl. ..................... 210/605; 210/623; 210/903; 210/906
(58) Field of Search ........................ 210/605, 620–623, 210/629, 630, 903, 906

(56) References Cited

U.S. PATENT DOCUMENTS

| | | | | |
|---|---|---|---|---|
| 3,964,998 A | * | 6/1976 | Barnard | 210/605 |
| 5,395,527 A | * | 3/1995 | Desjardins | 210/608 |
| 5,733,456 A | * | 3/1998 | Okey et al. | 210/605 |
| 5,792,355 A | * | 8/1998 | Desjardins | 210/605 |
| 5,824,222 A | * | 10/1998 | Keyser et al. | 210/607 |
| 5,853,589 A | * | 12/1998 | Desjardins et al. | 210/605 |
| 6,004,456 A | * | 12/1999 | Khudenko | 210/122 |
| 6,039,873 A | * | 3/2000 | Stahler | 210/605 |
| 6,224,646 B1 | * | 5/2001 | Arato et al. | 71/9 |
| 6,312,599 B1 | * | 11/2001 | Reid | 210/605 |

FOREIGN PATENT DOCUMENTS

| | | | |
|---|---|---|---|
| EP | 0302545 | * | 2/1989 |
| EP | 0458760 | * | 11/1991 |
| WO | WO 93/13023 | * | 7/1993 |

* cited by examiner

*Primary Examiner*—Fred Prince
(74) *Attorney, Agent, or Firm*—Jacobson Holman PLLC

(57) ABSTRACT

A process which comprises using a tank or compartment suitable for both anoxic and anaerobic conditions for biologically removing both nitrogen and phosphorus from waste water.

7 Claims, 2 Drawing Sheets

BIOLOGICAL NUTRIENT REMOVAL USING THE OLAOPA PROCESS

This is a nationalization of PCT/GB99/04059, filed Dec. 6, 1999 and published in English.

The present invention relates to an industrial process to be used for nutrient removal, specifically for the removal of nitrogen and phosphorous, from water and wastewater. For example, it is applicable to industrial and municipal wastewater.

Conventionally, different processes for removing biological nutrients from water and wastewater have used a combination of activated suspended solids treatment or fixed film processes, as have been described in textbooks, professional journals and magazines. Known processes disclose the removal of nitrogen of phosphorous, but not the removal of nitrogen and phosphorous together.

In biological nitrogen removal, the incoming domestic crude sewage contains nitrogen in the form of industrial ammonia, urea and fertilizer. During the process, nitrogen is first converted to nitrites by bacteria, for example, by species of Nitrosomonas, in the presence of oxygen, and then into nitrates by bacteria, for example, by species of Nitrobacter. In order to de-nitrify, that is to remove nitrogen from the solution, nitrates need to be fed into an anoxic tank where the oxygen level is less than 0.5 mg/l. De-nitrifying bacteria, for example, of the species of Pseudomonas, Achromobacter and Bacillius, reduce the nitrates to nitrogen gas using organic carbon for metabolism.

In all known cases the biological removal (i.e. relying on naturally occurring bacteria for treatment) of nitrogen involves building tanks referred to as anoxic tanks, which are partially devoid of oxygen, and re-circulating a proportion of nitrified effluent into them. Under anoxic conditions with a carbon source, naturally occurring bacteria will de-nitrify the nitrified effluent, which leads to the production of nitrogen gas.

Phosphorous is present in domestic sewage due to the influence of detergents, fertilizers and industrial effluents. Biological phosphorous removal requires three distinct phases. 1. An anoxic phase during which a proportion of the incoming poly-phosphorous is taken up by phosphorous accumulating bacteria. 2. An anaerobic phase (completely devoid of oxygen) during which the poly-phosphorous is regurgitated into solution by the bacteria and during which volatile fatty acids produced by decaying organic matter in solution are taken up by the bacteria in the form of poly-beta- hexabutyrate, which increases the digestion capacity of the bacteria for the third phase, 3. An oxic phase, for example, in an aeration tank, during which phosphorous accumulating bacteria will take up the regurgitated phosphorous in solution plus any other available form of phosphorous in solution in the form of ortho-phosphate.

The most popular of the known technologies for removing nitrogen from wastewater is referred to as 'the BARDENPHO process'. This process essentially alternates an aerobic zone with an anoxic zone in different tanks to achieve nitrogen removal.

It is an object of the present invention to provide a process for removing both nitrogen and phosphorous from wastewater in a single process.

It is a second object of the present invention to provide a process for the treatment of wastewater for the removal of nitrogen and phosphorous having a reduced number of steps and being both cost effective and more efficient.

It is a further object of the present invention to provide a process wherein recycling of a mixed liquor during the process leads to a greater degree of de-nitrification, while also removing a greater proportion of organic carbon from the effluent.

According to the present invention there is provided a process for the removal of at least one of wastewater or raw sewage, including biological removal of nitrogen and optionally phosphorous therefrom, said process comprising at least a first step, in a tank or compartment which is sized and/or converted to be suitable for both anoxic and anaerobic conditions, involving feeding the wastewater/raw sewage into the tank or compartment so as to partially fill the tank or compartment and so as to provide anoxic and anaerobic regions within the wastewater/raw sewage and an oxic region within the tank or compartment.

Preferably, the first step comprises feeding the wastewater/raw sewage into a balancing tank or a converted primary settlement tank. The first step may comprise feeding the wastewater/raw sewage into a balancing tank and a primary settlement tank.

The process preferably further comprises a second step comprising processing in an aeration tank suitable for aerobic conditions and a third step, acting as a clarifier, involving recycling a proportion of mixed liquor from the second step back into the first step.

Preferably, a proportion of the sludge and associated micro-organisms retrieved from the third step are recycled back into the second step to maintain a viable population of micro-organisms. A proportion of sludge and mixed liquor may also be recycled from the third step back into the first step.

Also preferably, an external carbon source may be introduced to the first step.

In order to aid in understanding the invention some specific embodiments thereof will now be described by way of example and with reference to the accompanying drawings, in which.

Figure 1:
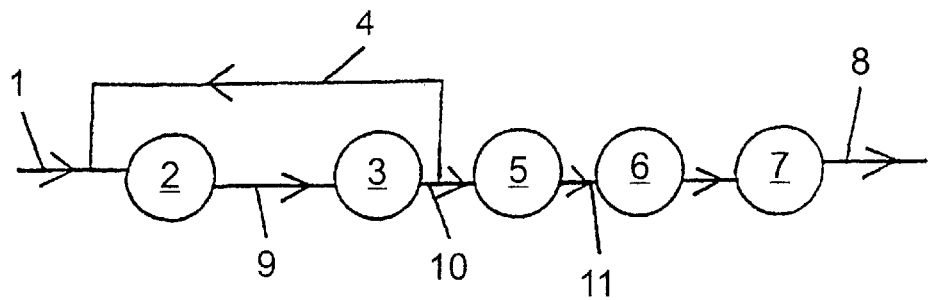
FIG. 1 is a flow diagram showing a known process for the treatment of wastewater.

Referring to FIG. 1, there is shown a flow diagram of a known process for the treatment of wastewater, known in the art as "the BARDENPHO process". This process comprises a minimum of five separate tank or compartment phases for the removal of nitrogen. Raw wastewater or primary effluent 1 is fed into an anoxic tank 2 where partial de-nitrification can be carried out, the secondary effluent 9 to be treated is then fed into an aerobic tank 3 where both oxidation and nitrification are carried out, at this stage some of the tertiary effluent 10 may be recycled 4 to the anoxic tank 2, and the tertiary effluent 10 is fed into an anoxic tank 5 where de-nitrification is carried out. Since, much organic carbon has been removed in the preceding stages, it may be necessary to add a further source of organic carbon, such as methanol, to speed up the de-nitrification process. The quaternary effluent 11 is then fed into an aerobic zone 6 and finally into a secondary clarifier 7, the treated effluent 8 then leaves the system.

According to published data, the maximum rate of de-nitrification achieved with "the BARDENPHO process"

under a non-carbon limiting condition is in the order of 0.12 kg.N/kg.VSS.d. A simulated example using this process resulted in a de-nitrification rate of 0.23 mg.N/L.h. for domestic waste and 0.14 mg.N/L.h, for industrial strength wastewater. For same strength wastewater exposed to similar environmental conditions, the process according to the present invention recorded a de-nitrification rate of 10.26 mg.N/L.h. for domestic waste and 10.95 mg.N/L.h. for industrial strength wastewater. This represents an almost 100 times improvement on existing processes. The benefits of de-nitrification include oxygen recovery, reduction in carbonaceous concentration of wastewater requiring treatment and alkalinity recovery. This then leads to less power requirement on the aerating medium and less footprint requirement. It has no known disadvantages. The importance of the process according to the present invention is that treatment plants will not have to be as big or as expensive as they currently are to achieve high quality effluent.

Figure 2:
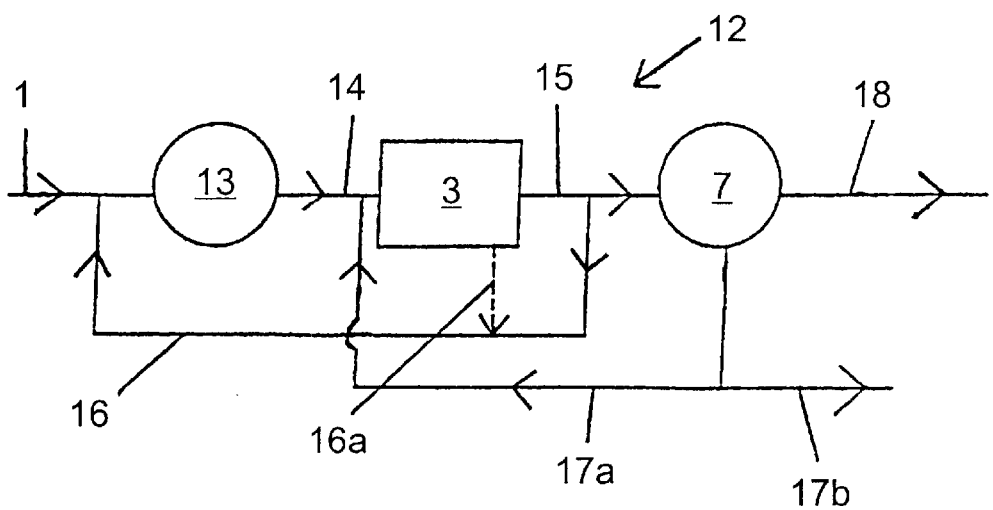
FIG. 2 is a flow diagram showing one layout of the process of the present invention.
Figure 3:
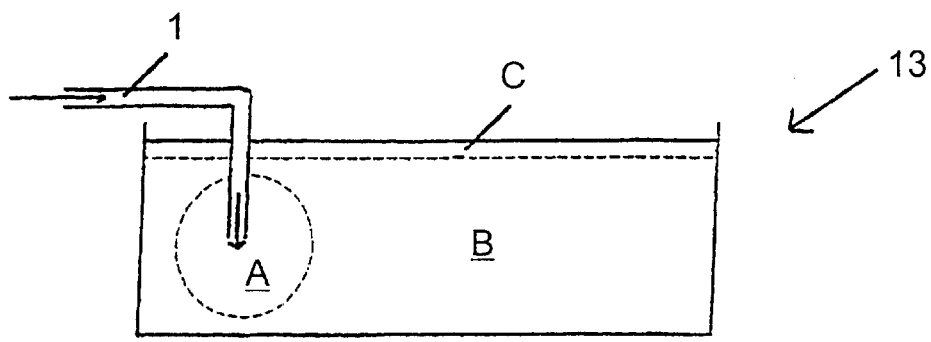
FIG. 3 is a cross-section of a balancing tank of the layout of the process of FIG. 2.
Figure 4:
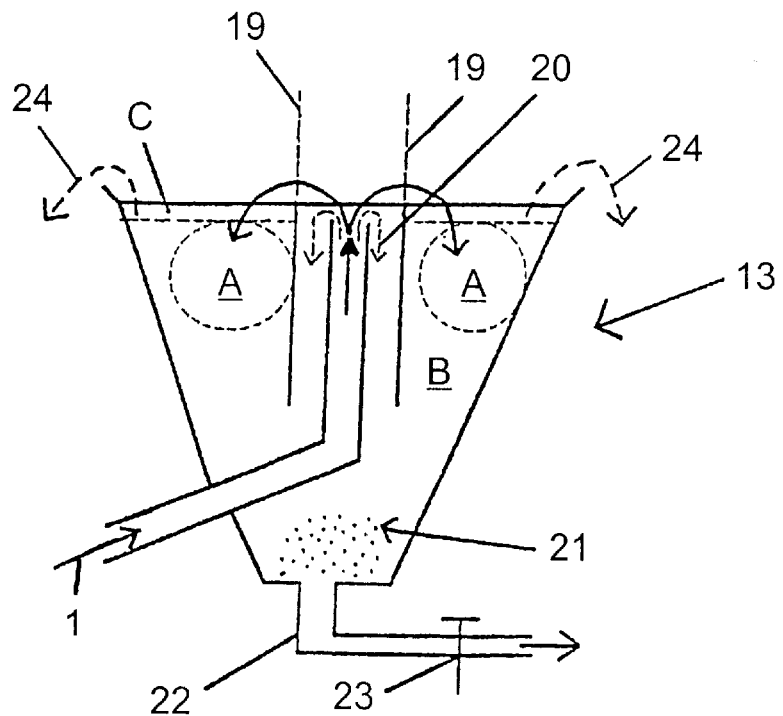
FIG. 4 is a cross-section of a converted primary settlement tank of the layout of the process of FIG. 2.

Referring now to FIGS. 2 to 4 in which common elements are indicated with the same reference numerals, there is shown one possible layout of the process for the treatment of wastewater according to the present invention. The system 12 comprises a minimum of three steps or a maximum of four steps consisting of at least three separate tanks or compartments. However, it can obviously be foreseen that if the process according to the present invention were applied to an existing system or applied with other known technologies, then more steps may be incorporated to fulfill additional functions. Raw sewage or wastewater 1 is fed into the first step, a balance tank or converted primary settlement tank 13. Where the first step comprises a balance tank 13, as shown in FIG. 3, the balance tank 13 is sized so that an an oxic zone A occurs around the entry point of the raw sewage or wastewater 1, an anaerobic zone B occurs in the surrounding area and an oxic zone C may occur in the surface layer, usually approximately 6 cm deep. The tank 13 must be sized to enable these zones to occur and where only the removal of nitrogen is required a smaller tank 13 having only an anoxic zone A can be used. The size of the tank 13 required depends on the characteristics of the crude sewage and flow.

Alternatively, the first step may comprise a converted primary settlement tank 13, an example of which is shown in FIG. 4. In a non-converted primary settlement tank the wastewater 1 enters the tank 13, the central baffles 19 are in a raised position as indicated by the dotted lines forcing the wastewater 1 downwards as indicated by the dotted arrows 20, sludge 21 settles at the bottom and is periodically removed by means of the outlet 22, which has a stop tap 23. The effluent for further treatment flows over the top of the sides of the tank as indicated by the dotted arrows 24. In a converted primary settlement tank 13 the central baffles 19 are lowered allowing the wastewater 1 to flow over them and an anoxic zone A is created where the wastewater 1 enters the tank 13. The surface layer of liquid may form anoxic zone C and in the remainder of the tank 13 an anaerobic zone B occurs. The secondary effluent 14 for removal from the tank 13 to the second step in tank 3 is removed via the outlet 22 to which a flow control valve (not shown) may be connected. The process according to the present invention may also comprise a first step which consists of a balancing tank 13 followed by a non-converted primary settlement tank and this may be particularly desirable where the process according to the present invention is applied to an existing wastewater treatment site.

The following biological reactions can occur in the balancing tank or converted primary settlement tank 13: in the anoxic zone A, de-nitrification occurs and the anoxic phase in phosphorous removal during which a proportion of the incoming poly-phosphorous is taken up by phosphorous accumulating bacteria; in the anaerobic zone B, the anaerobic phase of the phosphorous removal process occurs during which the poly-phosphorous is regurgitated into solution by the bacteria and during which volatile fatty acids produced by decaying organic matter in solution are taken up by the bacteria in the form of poly-beta-hexabutyrate.

The secondary effluent 14 is then fed into an aeration tank or compartment 3 being an aerobic zone, in which combined oxidation and nitrification occur and the final oxic phase of phosphorous removal occurs. Some of the tertiary effluent or nitrified mixed liquor 15 is then recycled 16 to the balancing/primary tank 13 and the remaining tertiary effluent 15 is fed into the secondary clarifier 7. Advantageously, the nitrified mixed liquor 15 is removed after having been processed through the tank as indicated by the dotted arrow 16a. Further settlement occurs in the secondary clarifier 7 and a proportion of the sludge including micro-organisms (known as the return activity sludge) may be recycles 17a back to the tank 3 to maintain the populations of micro-organisms, while excess return activity sludge 17b can be removed from the system 12 as waste. The remaining treated effluent 18 is released from the system 12.

In known processes for the removal of nitrogen, the arrangement of the anoxic tank after the production of nitrates can vary, in most known processes an extra tank is included after the final settlement tank relying on the fact that the de-nitrifying bacteria will use the remaining organic carbon in the effluent to de-nitrify. However, in practise there is often not enough carbon left in the system and, therefore, the process of de-nitrification takes much longer than is necessary. To overcome, this problem, known processes make provisions for an external carbon source such as methanol to be injected into the solution. However, according to the process of the present invention a proportion of the mixed liquor containing nitrates 15 is recycled 16 back to the balancing or primary tank 13 (which contains the greatest concentration of organic carbon in the system) leading to a reduced total nitrogen concentration in the final effluent 18. Since the active bacteria use up a sizeable proportion of organic carbon to achieve de-nitrification in the anoxic zone A of the process according to the present invention, the carbonaceous material needing treatment in the aeration zone 3 is reduced and a considerable improvement in final effluent quality can be achieved.

The removal of phosphorous according to the present invention eliminates the need for an anoxic tank upstream of an anaerobic tank.

The balancing tank 13 in the process according to the present invention will in general be used to balance incoming flows to a treatment works and work as a biological reactor bringing nitrified mixed liquor into close proximity with crude sewage at all times. In the case of the BARDENPHO process as shown in FIG. 1, a separate tank or compartment 2 is sized according to de-nitrification requirements defining the anoxic zone. This implies that there is a limit to the re-circulating rate of nitrified mixed liquor achievable. In the case of the process according to the present invention, nitrified mixed liquor is returned back to the balance tank at an optimum rate to satisfy the requirement of the final effluent i.e. re-circulation rate is variable. The need to limit the size of the additional treatment unit under the BARDENPHO process limits re-circulation rates to approximate 1 Dry Weather Flow (DWF). Where balance tanks are used, the flow variation being balanced is generally between 0.3 DWF and 3 DWF. In the process according to the present invention the incoming raw sewage and wastewater 1 is used as a rich source of carbonaceous material needed for de-nitrification. Therefore, downstream of this tank there is no need for subsequent alternation of anoxic tanks 5 and aerobic tanks 6. The shape and size of the balancing or primary settlement tank 13 required depends on the quality of the effluent desired but essentially by feeding the aerobic reactor at the balanced feed rate plus re-circulation rate the essential feature of balancing incoming flows is retained.

Known processes for the treatment of wastewater are designed to cope with maximum flow received. When a balance tank is used, since the flow rate is controlled, the capacity of treatment units, tanks or compartments required is reduced. The process of balancing assumes accumulation of crude sewage in the balance tank. According to the present invention, this tank 13 can be sized so that in addition to providing balancing, it can act as both an anoxic and an anaerobic tank. This occurs due to the constant re-circulation 16 of nitrified mixed liquor or effluent which causes the immediate area around the pipeline entering the tank 13 to go anoxic and then finally to anaerobic conditions. The ability to define these stages in a single tank allows both nitrogen and phosphorous removal to occur at the same time. Advantageously, removal of both nitrogen and phosphorous in the balance tank 13 means that the footprint requirement for the process according to the present invention is minimised.

Figure 5:
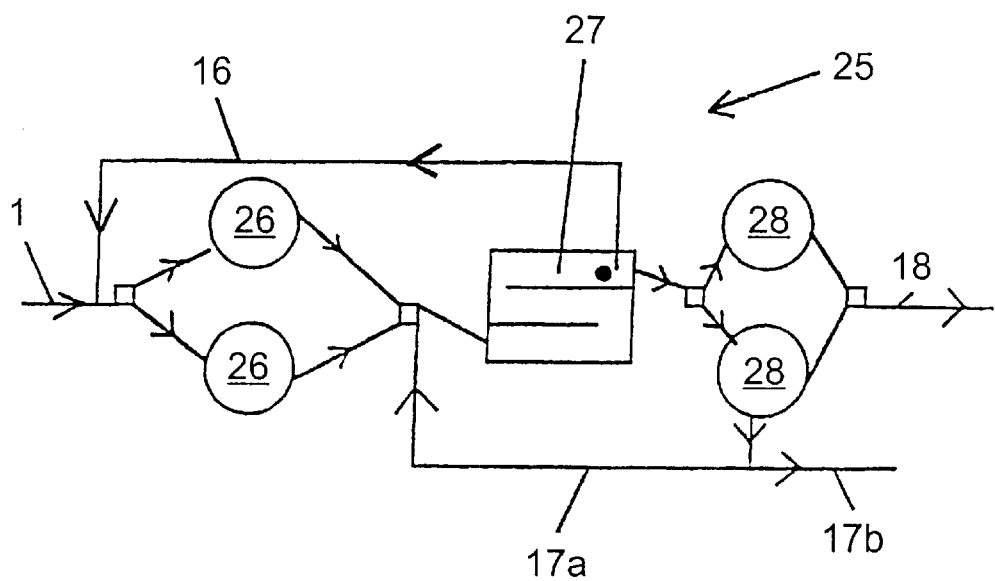
FIG. 5 is a flow diagram showing the application of the process of the present invention to a conventional activated sludge process.

Referring to FIG. 5 in which common elements are indicated with the same reference numerals, there is shown a conventional activated sludge process 25 in which crude sewage or wastewater 1 is passed into primary sedimentation tanks for physical separation of solids 26, the effluent is then passed to an aeration tank 27 for biological oxidation of carbonaceous material and nitrates, then the effluent is passed to final settlement tanks 28. When applying the process of the present invention to the conventional activated sludge process 25, a balance tank (not shown) will be sized upstream of the primary tanks 26 to balance incoming flows and serve as an anoxic or anoxic and anaerobic tank. In operation this tank will always be partially full. The effluent from the balance tank then goes to into the primary tanks 26 from where primary sludge is wasted. A proportion of this sludge may be re-circulated into the aeration tank 27, being an aerobic zone, to help maintain a viable population of micro-organisms in the aerobic tank 27 in addition to the recycling 17a of return activated sludge. The difference in operation of the nitrogen removal phase and phosphorous removal mode, is that a mixer is required in the primary tanks to keep the sludge in suspension to allow the phosphorous removing micro-organisms to ingest the volatile fatty acids formed in the primary tanks 26 and then transfer them into the aeration tank 27 for phosphorous removal. There will be minimal wastage from the primary tanks 26 and on activated sludge sites using extended aeration, i.e. where the primary tank 26 is not available, the balance tank is sized so that all the phases take place within the balance tank.

It will also be understood that various alterations and modifications may be made to the above process without departing from the scope of the invention, and that the invention is applicable to other forms of wastewater treatment, such as sequencing batch reactors and plants with submerged aerated filters. By sizing existing balancing tanks or converting existing primary settlement tanks or septic tanks the process of the present invention can be applied to known systems to enable the removal of both nitrogen and phosphorous and to increase the efficiency and lower the cost involved with known systems. For example, application of the process of the present invention to a submerged aerated filter system, in which the aeration tank 3 and the clarifier 7 are combined in a single system, would require adaptation by recycling of the sludge 17a from the bottom of the clarifier 7 back to the first step 13. Conventionally, in submerged aerated filter systems the sludge is tapped at regular intervals, however, on application of the process of the present invention to this system the sludge can be continuously removed. It can also be seen, that the process of the present invention could be used for just nitrogen removal, in which case the balancing tank required would be smaller in size since only anoxic conditions would be required.

What is claimed is:

1. A biological process for the removal of nitrogen and phosphorus from municipal or industrial waste water, comprising the steps of, a) conducting an incoming flow of waste water to a balancing tank, for balancing the flow of liquor to a subsequent stage of the process, b) causing fermentation of said waste water in said balancing tank, c) controlling the flow of liquor from said balancing tank at a rate such that a first, anoxic, zone and a second, anaerobic, zone of fermentation is established in said balancing tank for denitrification and removal of phosphorus from liquor fermented therein d) conducting liquor flowing from said balancing tank to an aerobic zone, for oxidation and nitrification of components of the liquor, e) recirculating nitrified mixed liquor from said aerobic zone to said anoxic zone at a flow rate selected to meet a desired state of fermentation of the liquor within said balancing tank, and f) adjusting the flow of liquor from said balancing tank to compensate for the rate of recirculation of liquor from said aerobic zone to said anoxic zone.

2. A process according to claim 1, wherein liquor flowing from the balancing tank is conducted to at least one primary settlement tank downstream of the balancing tank.

3. A process according to claim 1 wherein an oxic zone is established in said balancing tank at the surface of the liquid.

4. A process according to claim 1 wherein liquor from said aerobic zone is conducted to a clarifier stage downstream of said aerobic zone.

5. A process according to claim 4, wherein a proportion of sludge and associated microorganisms present in said clarifier stage is recycled back to said aerobic zone to maintain a viable population of microorganisms.

6. A process according to claim 4 wherein a proportion of sludge and microorganisms present in said clarifier stage is recycled back to said balancing tank.

7. A process according to claim 1, wherein the dimensions of said balancing tank are so selected in relation to the incoming flow of waste water as to provide balancing of an incoming flow varying between 0.3 DWF and 3 DWF.

\* \* \* \* \*